July 21, 1970   W. KAESEMODEL   3,521,531
TRUNK TYPE PISTON FOR INTERNAL COMBUSTION ENGINES
Filed Nov. 6, 1967   2 Sheets-Sheet 2
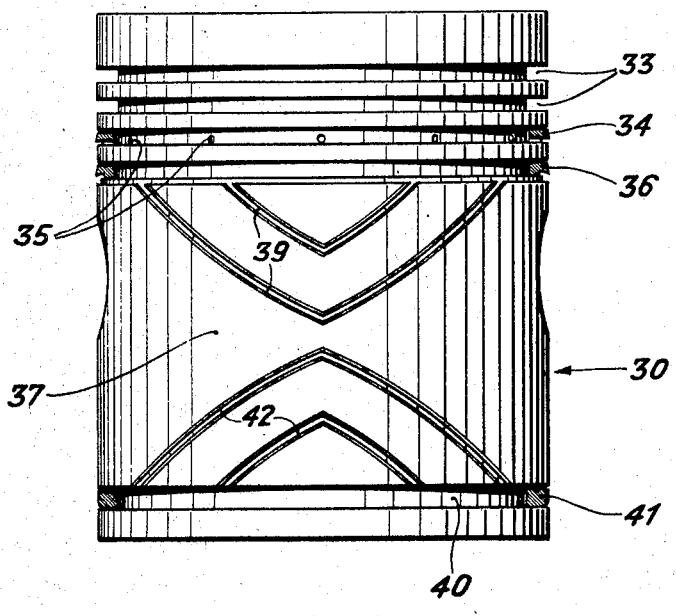
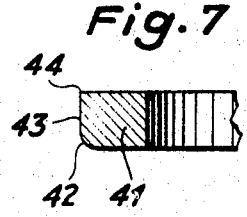 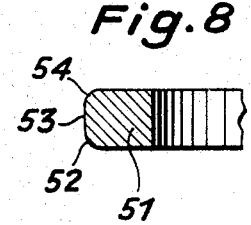 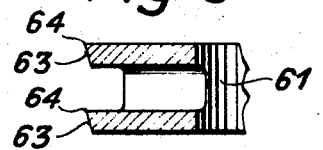
Inventor:
Werner Kaesemodel
BY Pennie, Edmonds,
Morton, Taylor and Adams
ATTORNEYS United States Patent Office 3,521,531
Patented July 21, 1970

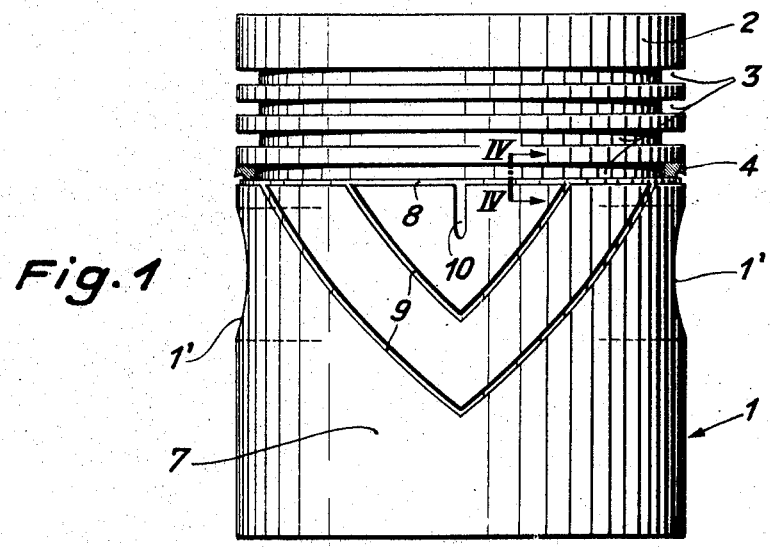
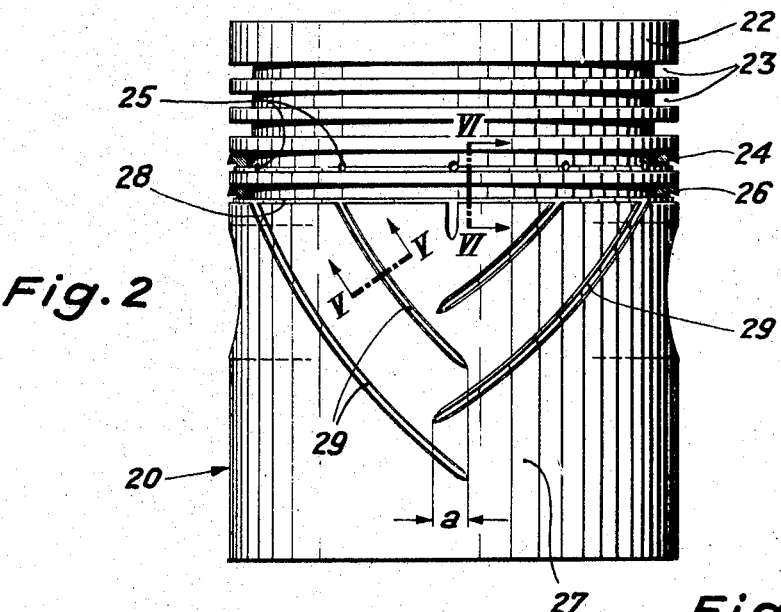
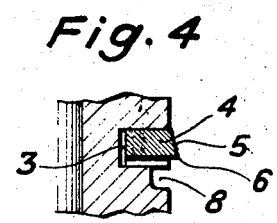
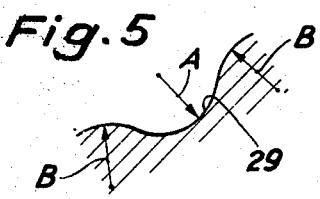
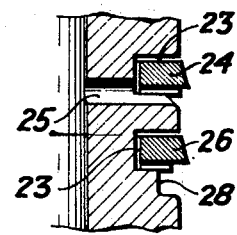

3,521,531
TRUNK-TYPE PISTON FOR INTERNAL
COMBUSTION ENGINES
Werner Kaesemodel, Zurich, Switzerland, assignor to
Sulzer Brothers Limited, Winterthur, Switzerland, a
Swiss company
Filed Nov. 6, 1967, Ser. No. 680,762
Claims priority, application Switzerland, Nov. 17, 1966,
16,531/66
Int. Cl. F01b 31/10
U.S. Cl. 92—160  2 Claims

ABSTRACT OF THE DISCLOSURE

There is disclosed a trunk-type piston for internal combustion engines having an oil control ring between the compression rings and piston skirt, this oil control ring being disposed in a groove which is sealed off from the interior of the piston, but which communicates with one or more grooves formed in the surface of the piston skirt for the delivery of oil thereto. A second oil control ring may be provided above the first, in a groove having bores leading to the interior of the piston, and an oil distributing ring may be provided below the control rings, this distributing ring having a rounded lower edge and a sharp upper edge, disposed in a groove communicating with additional grooves extending upwardly over the surface of the skirt.

BACKGROUND OF THE INVENTION

The prior art

The present invention relates to a trunk piston for a reciprocating internal combustion engine, the piston comprising an oil control ring disposed between the compression rings and the running surface or skirt of the piston.

Trunk pistons of reciprocating internal combustion engines must of course withstand substantial lateral forces produced by gas pressures when the connecting rod is in an inclined position. The piston skirt which receives the lateral force must therefore be satisfactorily lubricated if seizures are to be avoided. Unfortunately, if the skirt is well lubricated, oil may leak past the compression rings into the engine combustion chamber, oil consumption may be high, and there may be heavy carbonization of the combustion chamber.

One known way of solving these contradictory requirements, i.e. adequate lubrication of the skirt and exclusion of oil from the combustion chamber, is to provide the piston with oil control or scraper rings. These rings usually have a conical outer surface terminating in a sharp control or scraping edge, the large end of the conical surface being at the end of the ring near the crankcase and away from the combustion chamber. The oil control rings heretofore proposed are received in grooves which communicate via bores with the piston interior. The sharp edge of the control ring scrapes the oil off the cylinder wall so that only a thin oil film just sufficient for lubricating the piston skirt remains. The oil removed flows from the control ring groove through the bores therein into the piston interior and thence back to the crankcase. Control rings of this kind can of course be disposed either at the lower edge of the piston, i.e. the piston edge remote from the combustion chamber, and/or as the lowest ring in a set of compression rings at the upper end of the piston.

A disadvantage of these known constructions is that their lubricating action is inadequate at heavy piston loads such as occur for example in supercharged diesel engines. There exists therefore a risk of seize-ups, particularly in diesel engines which have heavy supercharging and are fitted with conventional trunk pistons.

SUMMARY OF THE INVENTION

It is an object of the invention to obviate this disadvantage and to provide a trunk piston suitable for heavy loads such as are found in highly supercharged diesel engines. To this end, according to the invention, the oil control ring is disposed in a ring groove sealed off from the interior of the piston, and at least one lubricating groove is provided in the piston skirt, merging into or communicating with the control-ring groove and serving to receive the scraped oil and to transmit it to the skirt.

This feature improves the lubrication of the skirt and also provides improved isolation of the crankcase from the combustion chamber. A control ring having the conventional arrangement and disposed at the lower end of the piston is unnecessary in the construction of the invention. The oil spray adhering to the cylinder wall lubricates the piston skirt without substantial hindrance. The control ring construction of the invention prevents an excessive amount of lubricating oil from reaching the compression rings and combustion chamber. The oil scraped off by the control ring does not return to the piston interior but remains on the skirt, to which it is supplied through lubricating grooves in the piston outer surface. There is therefore an increased supply of lubricating oil to the skirt.

According to a further feature of the invention, a second oil control ring is disposed in an adjacent groove on the upper side of the first control ring, i.e. the side adjacent the combustion chamber, and the groove for this second control ring can in known manner be connected via bores to the piston interior. In this way, while insuring thorough lubrication of the exterior running surfaces of the piston, there is provided improved isolation of the compression rings, so that lubricating oil consumption and combustion chamber carbonization can be reduced despite improved lubrication of those running surfaces, herein referred to for brevity as the skirt of the piston.

In accordance with the invention a distributing ring can be provided at the lower edge of the piston, remote from the combustion chamber. This ring has a rounded outer edge on the side thereof remote from the combustion chamber; and the rounded edge merges into a surface facing the cylinder wall. The latter surface of this ring can be either cylindrical or slightly conical, the apex of the conical surface being remote from the combustion chamber so that the surface tapers toward the crank case. The distributing ring may however take the form of a known oil control ring having a slightly conical outside surface but with a sharp scraping edge disposed adjacent the combustion chamber, such ring being disposed in a groove which is sealed off from the piston interior. These features insure uniform lubricating oil distribution along the height of the piston skirt, together with a metering action, since the quantity of oil which penetrates and remains between the piston skirt and the cylinder wall can also be determined by a choice of the rings or their shape.

Further in accordance with the invention, there may be provided lubricating grooves which extend into the most heavily loaded, central part of the piston skirt and which are associated with the oil distributing ring at the lower edge of the piston. These lubricating grooves extend from the groove of the oil distributing ring just mentioned obliquely upward over the outer surface of the skirt to the vicinity of the mid-height thereof. This feature helps to increase the lubrication of the piston with the cylinder wall, since the upwardly extending sharp edge of the bottom distributing ring has a scraping action when the piston rises, so that oil is prevented from departing from the gap between the piston and the cylinder wall. The oil scraped off in this way is supplied through the lubricating grooves concerned to the most heavily loaded central region of the piston skirt.

Preferably, the lubricating groves in the piston running surface have rounded edges, to facilitate flow of oil out of these grooves and into the clearance between the piston and the cylinder walls.

BRIEF DESCRIPTION OF THE DRAWINGS

The invention will now be further described in terms of a number of exemplary embodiments shown diagrammatically in the drawings wherein:

FIGS. 1–3 show three embodiments of the piston according to the invention in side elevation perpendicularly to the wristpin axis, the rings being shown in section except as omitted entirely for reasons of clarity;

FIG. 4 is a section through the lowermost groove 3 along the line IV—IV in FIG. 1;

FIG. 5 is a section through a lubricating groove along the line V—V in FIG. 2;

FIG. 6 is a section through two control-ring grooves on the line VI—VI of FIG. 2; and FIGS. 7–9 are views to an enlarged scale of rings which can be used in the groove at the bottom edge of the piston in the embodiment shown in FIG. 3.

DESCRIPTION OF PREFERRED EMBODIMENTS

Referring to FIG. 1, a trunk piston 1 is formed with a bore 1' for a wristpin and, in the crown or upper portion 2 thereof, with four ring grooves 3. The topmost three grooves, which are shown empty, are adapted to receive compression rings which may be of known type. An oil control or scraper ring 4 (see also FIG. 4) is shown in the bottom groove 3 and has a conical outer surface 5 which terminates in a downwardly directed sharp edge 6. In contrast to known control ring constructions, the bottom groove 3 is sealed off from the piston interior and hence lacks the bores which conventionally connect that groove to the piston interior to drain away the oil. Consequently, the oil scraped off the cylinder wall, instead of returning to the piston interior, accumulates in front of, i.e. below, the control ring 4. The piston skirt 7 is formed with lubricating grooves which serve to distribute the oil thus removed from the cylinder walls. A groove 8 acting as an oil reservoir is provided, the groove 8 constituting a shallower extension of the lowermost groove 3 on the lower side thereof. Lubricating grooves 9 extend from the groove 8 to the piston skirt 7. Preferably, the grooves 9 extend from that part of the piston skirt or exterior surface which is near the control ring 4 down at least half-way toward the lower edge of the piston. This construction promotes a flow of oil towards regions where it is most required, i.e. at the mid-height of the piston. The lubricating grooves may however extend vertically, and such a lubricating groove is shown at 10 in FIG. 1 between the grooves 9.

FIG. 2 shows a piston according to the invention provided with five grooves 23 at the upper end thereof. The uppermost three of these receive compression rings. The fourth groove from the top (seen also in FIG. 6) is adapted to receive an oil control ring 24 and is provided with bores 25 which provide communication between that groove and the piston interior by way of which the oil scraped off the cylinder walls by the ring 24 can be discharged to the interior of the piston for return to the crank case. The ring 26 disposed in the lowermost groove 23 corresponds basically to the ring 4 of the embodiment shown in FIG. 1 and, like that ring 4, is disposed in a groove which does not communicate with the piston interior, i.e. which lacks the connecting passages or bores 25 conventional in grooves for oil control rings. The running surface or skirt 27 of piston 20 is also formed with lubricating grooves 28 and 29. These however do not, as in the embodiment shown in FIG. 1, join together in the central region of the height of surface 27 but are offset from one another with their ends overlapping by a small amount a.

FIG. 5 is a cross-section through one of the grooves 29 of FIG. 2. The groove has an inner radius A and two outer radii B. The outer radii B serve to round the outer edges of the groove 29 so as to facilitate the flow of oil across these edges, for lubrication of the surface 27.

FIG. 3 shows a piston 30 which is similar to the piston 20 of FIG. 2 as regards the construction of its grooves 33. The two lowermost grooves 33 receive oil control rings 34 and 36, the ring 34 being disposed in a groove communicating with the piston interior via bores 35 which correspond to the bores 25 in FIG. 2. The piston 30 is provided at its lower edge with a groove 40 receiving an oil distributing ring 41. Lubricating grooves 42 for the piston outer surface extend upwards from the groove 40; the grooves 42 resemble the lubricating grooves 29 of FIG. 2 but extend in the opposite direction, i.e. obliquely upwards from the groove 46 toward the mid-height of the piston.

FIG. 7 is a view of the ring 41 to an enlarged scale and in cross-section. The ring 41 has a basically rectangular cross-section with a rounded edge 42. The outer surface 43 of the ring, being near the cylinder wall, may be either cylindrical or slightly conical. If the surface 43 is conical, the apex of the cone to which that surface conforms will be on the crank case side of the piston. The distributing ring construction shown in FIG. 7 has an upper edge 44 which provides a scraping action on upward motion of the piston, opposite to the scraping action of the upper oil control rings 34 and 36. Oil present between the outer surface 27 of the piston (FIG. 3) and the cylinder wall and between rings 36 and 41 cannot therefore escape and is guided through the lubricating grooves 42 to the central, most heavily loaded part of the surface 37.

FIG. 8 is a cross-section through another embodiment of a distributing ring usable in the groove 40 of FIG. 3. The distributing ring 51 shown in FIG. 8 has a substantially rectangular cross-section but its two outer edges 52 and 54 are rounded. A cylindrical surface 53 is disposed between the rounded edges 52 and 54. However, the surface between the rounded edges 52 and 54 can be continuous curving.

FIG. 9 is a cross-section through an oil control ring 61 of known type having two sharp edges 64. The ring 61 can be used in place of the rings 4, 24, 26, 34, 36 and of the ring 41. The ring 61, on which the sharp edges 64 are at the large ends of conical frusta, must be fitted, when used in place of a ring such as the ring 43, at the lower edge of the piston, so that the apices of the cones to which those frusta belong are on the crank case side of the piston. When rings as shown at 61 in FIG. 9 are used in place of ring 34 or 36 or both, they must be fitted with the edges 64 adjacent the lower end of the piston, so that the apices of those cones are on the combustion chamber side of the piston.

The present invention thus provides a trunk piston for internal combustion engines comprising a crown, as shown e.g. at 2 in FIG. 1, a skirt as shown at 7, 27 and 37 in FIGS. 1, 2 and 3, respectively, and at least one compression ring. It further comprises an oil control ring shown at 4 in FIG. 1, 26 in FIG. 2 and 36 in FIG. 3, received in a groove sealed off from the interior of the piston. The piston is hollow in accordance with usual practice. The skirt of the piston has formed in the exterior surface thereof at least one, and preferably more than one, lubricating grooves as indicated for example at 9 in FIG. 1, 29 in FIG. 2, and 39 in FIG. 3. This lubricating groove communicates with the groove accommodating the oil control ring just referred to and extends obliquely over the outer surface of the piston from the oil control ring groove toward the middle portion of the height of the piston skirt. The lubricating groove preferably has rounded outer edges as illustrated in FIG. 5. The piston may include a second oil control ring as illustrated at 24 in FIG. 2 and at 34 in FIG. 3, received in a groove having bores as indicated at 25 in FIG. 2 and at 35 in FIG. 3 which provide communication between that groove and the interior of the piston. Additionally, the piston may include an oil distributing ring as indicated at 41 in FIG. 3, received in a groove at or near the lower edge of the piston which is without communication with the interior of the piston, and from which one or more lubricating grooves formed in the outer surface of the piston skirt extend upwardly and obliquely over the outer surface of the piston as indicated at 42 in FIG. 3 of the drawings. The oil distributing ring advantageously has a rounded edge at the axial end thereof remote from the piston crown as indicated by the rounded edge 42 at the lower axial end of the ring 41 in FIG. 7, and it is advantageously bounded by a sharp edge at the axial end thereof adjacent the piston crown as indicated at 44 in FIG. 7 and at 64 in FIG. 9.

I claim:

1. A trunk piston for internal combustion engines comprising a crown, a skirt, a compression ring received in a groove adjacent the crown, said groove being closed off from the interior of the piston, a first oil control ring received in a groove located between the compression ring and the skirt and communicating with the interior of the piston, a second oil control ring between the first oil control ring and skirt, the second oil control ring being received in a groove sealed off from the interior of the piston, and an oil distributing ring received in a groove adjacent the lower edge of the skirt, said oil distributing ring having a rounded edge at the axial end thereof remote from the piston crown, the outer surface of the piston skirt having formed therein a first plurality of lubricating grooves communicating with the groove in which said second oil control ring is received and extending therefrom toward the end of the piston opposite the crown, and having formed therein a second plurality of lubricating grooves communicating with the groove in which said oil distributing ring is received and extending therefrom toward the piston crown.

2. A trunk piston for internal combustion engines comprising a crown, a skirt, a compression ring received in a groove adjacent the crown, said groove being closed off from the interior of the piston, a first oil control ring received in a groove located between the compression ring and the skirt and communicating with the interior of the piston, a second oil control ring received in a groove located between the first oil control ring and the skirt and sealed off from the interior of the piston, and a plurality of lubricating grooves extending obliquely over the surface of the skirt from the groove in which the second oil control ring is received toward the end of the piston opposite the crown.

References Cited

UNITED STATES PATENTS

| | | | |
|---|---|---|---|
| 2,861,852 | 11/1958 | Olsen | 92—158 |
| 1,424,701 | 8/1922 | Williams | 92—158 |
| 1,468,621 | 9/1923 | Alford | 92—160 |
| 1,480,481 | 1/1924 | Wakefield | 92—158 |
| 1,528,817 | 3/1925 | Dinnes | 92—160 |
| 2,178,993 | 11/1939 | Hill | 92—160 |
| 2,653,065 | 9/1953 | Appleton | 92—160 XR |
| 3,396,976 | 8/1968 | Reinhoudt et al. | 277—71 |

FOREIGN PATENTS

| | | |
|---|---|---|
| 485,803 | 2/1918 | France. |
| 752,329 | 7/1956 | Great Britain. |

CARROLL B. DORITY, Jr., Primary Examiner

U.S. Cl. X.R.

92—158, 208